United States Patent [19]

Kee

[11] Patent Number: 4,692,807
[45] Date of Patent: Sep. 8, 1987

[54] ELECTRONIC CAMERA HANDLE CONFIGURATION

[75] Inventor: Richard C. Kee, Chestnut Hill, Mass.

[73] Assignee: Polaroid Corporation, Cambridge, Mass.

[21] Appl. No.: 852,025

[22] Filed: Apr. 14, 1986

[51] Int. Cl.⁴ .............................................. H04N 5/30
[52] U.S. Cl. ...................... 358/229; 354/82
[58] Field of Search ................ 358/229, 909, 906; 354/82, 288 A, 288 R, 288 C, 288 U; 352/243

[56] References Cited

U.S. PATENT DOCUMENTS

| | | | |
|---|---|---|---|
| D. 268,676 | 4/1983 | Ohya ..................... | D14/78 |
| D. 278,238 | 4/1985 | Kurokawa et al. ........ | D14/78 |
| D. 278,338 | 4/1985 | Kurokawa et al. ........ | D14/78 |
| 3,078,757 | 2/1983 | Austin et al. ............ | 352/243 |
| 3,966,101 | 6/1976 | Taylor, III ............. | 354/82 |
| 4,083,480 | 4/1978 | Lee et al. ............... | 358/229 |
| 4,470,077 | 9/1984 | Komine ................. | 358/335 |
| 4,495,527 | 1/1985 | Kozuki et al. .......... | 360/33.1 |
| 4,511,932 | 4/1985 | Ushiro ................. | 360/33.1 |
| 4,625,243 | 11/1986 | Takubo ................ | 358/229 |

Primary Examiner—Gene Z. Rubinson
Assistant Examiner—Stephen Brinich
Attorney, Agent, or Firm—Edward S. Roman

[57] ABSTRACT

A video camera and handle configuration include a conventional side hand grip which may be grasped in the normal manner by the camera user so that the wrist and forearm of the camera user generally extend downwardly from the hand grip and novel support sections which extend laterally outward from the same side of the camera housing underlying the hand grip for engaging the wrist and/or forearm of the camera user to steady his hand when he grasps the hand grip and thereby reduce strain and fatigue to the camera user's arm when videotaping for extended periods of time.

10 Claims, 4 Drawing Figures

ELECTRONIC CAMERA HANDLE CONFIGURATION

BACKGROUND OF THE INVENTION

1. Field of the Invention

This invention relates generally to a handle configuration for a video camera and, more particularly, to a handle configuration for a video camera which steadies the camera user's grip while simultaneously reducing the strain required to hold the video camera in its operative position.

2. Description of the Prior Art

Conventional video camera systems generally comprise a video camera and a video cassette recorder (VCR) wherein the camera is separate from the VCR as a result of the size and weight of the camera and VCR. The video camera and VCR are connected together by a cable and carried together. Most recently, as a result of advances in electronic miniaturization and the use of CCD image sensing elements, it is possible to make video cameras small and light enough that the video cassette recorder (VCR) can be built into the camera housing. Such single body type cameras which include a built-in video cassette recorder (VCR) may be held in their operative positions by a hand grip on the side thereof with the aft portion of the camera housing extending sufficiently backward to rest atop the camera user's shoulder. Holding the camera in this manner, however, may present an uncomfortable strain on the camera user's shoulder. It may also prove awkward to the camera user if he is required to quickly move the camera while videotaping a scene. Video cameras with built-in video cassette recorders have also become compact enough that it is no longer necessary to have a lengthy housing extending rearwardly to engage the camera user's shoulder. Such cameras are now so compact that pistol grips may be used in place of the aforementioned side handle and shoulder engaging housing. Pistol grips, however, although entirely satisfactory for lightweight still image cameras may prove to be unduly tiring to the user of a video camera which is generally heavier and held for a substantially longer time in its operative position than a still image camera.

Therefore, it is a primary object of this invention to provide a novel handle configuration for a video camera which helps in steadying the camera user's hand while reducing strain on the camera user's arm during long periods of video image recording.

It is a further object of this invention to provide a novel handle configuration for a compact video camera of the type which has a built-in video cassette recorder wherein the handle configuration includes portions for engaging the camera user's wrist and/or forearm to steady the camera user's hand while reducing tiresome strain over extended periods of video recording.

Other objects of the invention will be, in part, obvious and will, in part, appear hereinafter. The invention accordingly comprises a mechanism and system possessing the construction, combination of elements, and arrangement of parts which are exemplified in the following detailed disclosure.

SUMMARY OF THE INVENTION

A video camera comprises a housing having an upper housing portion operatively connecting an objective lens and viewfinder display and a lower housing portion extending downwardly from the upper housing portion. A hand grip extends laterally outward from a side portion of the upper housing portion and is oriented with respect to the upper housing portion so that when grasped by a camera user to hold the camera in its normally intended operative position, the camera user's wrist and forearm extends generally downward from the hand grip. Support sections extend laterally outward from a side portion of the lower housing portion at a location generally underlying the hand grip for engaging the wrist and/or forearm of the camera user so as to steady his hand when he grasps the hand grip to hold the camera in its normally intended operative position. The support sections may comprise arcuate portions which wrap around the camera user's wrist and/or forearm. In addition it is preferred that the lower housing portion contain a video cassette recorder (VCR).

BRIEF DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

DESCRIPTION OF THE PREFERRED EMBODIMENTS

Figure 1:
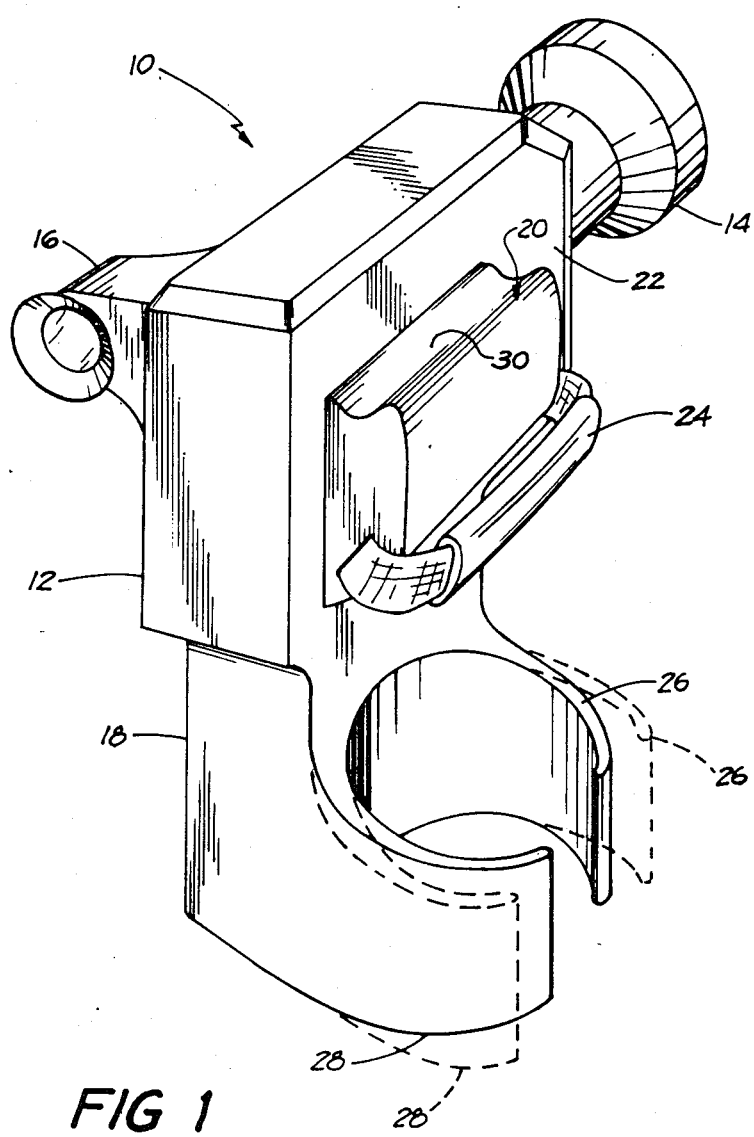
FIG. 1 is a perspective view of a video camera having the handle configuration of this invention.

Referring now to FIG. 1, there is shown generally at 10 the video camera of this invention having the steadying support members of this invention. The video camera 10 comprises an upper housing portion as shown generally at 12 operatively connecting an objective lens 14 and a viewfinder display 16 in a conventional manner as is well known in the art. The upper housing portion 12 might also include an image recording array (not shown) such as a CCD array suitably positioned relative to the camera objective 14 to electronically record an image in a manner as is well known in the art. The video camera 10 may also comprise a lower housing portion 18 extending downwardly from the upper housing portion 12 in integral connection therewith. The lower housing portion 18 may house a video cassette recorder (VCR) to record the images sensed by way of the objective lens 14 and CCD array. The video cassette recorder (VCR) in the housing 18 requires only a recording capability and thus may be made as small and light as possible. Video cameras incorporating video cassette recorders (VCR) in one integral housing are now well known in the art as described in U.S. Pat. No. 4,470,077, entitled "Video System", issued Sept. 4, 1984.

Figure 2:
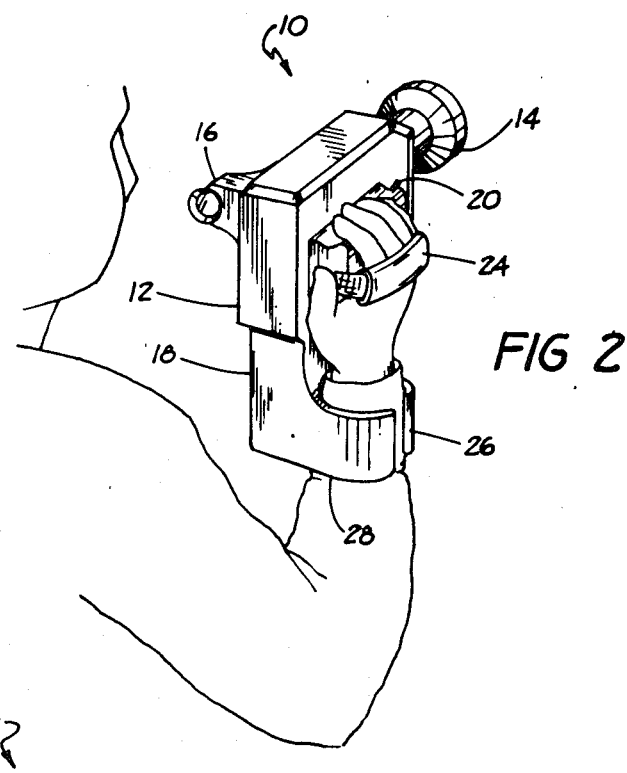
FIG. 2 is a perspective view of the camera of FIG. 1 held by a camera user in its normally intended operative position.
Figure 3:
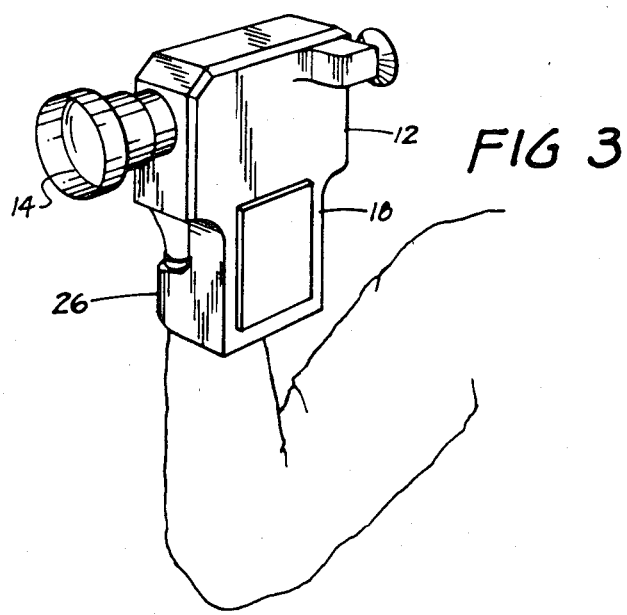
FIG. 3 is another perspective view of the camera of FIG. 1 held by a camera user in its normally intended operative position.

The upper housing portion 12 includes one integral side wall portion 22 from which an elongated integral hand grip as shown generally at 20 extends laterally outward from the side thereof. The hand grip 20 is oriented with respect to the upper housing portion 12 so that when grasped by a camera user in the ordinary manner to hold the camera in its normally intended operative position, the camera user's wrist and forearm extend generally downward from the hand grip 20 as best shown in FIGS. 2 and 3. The hand grip 20 comprises an elongated concave top surface 30 which may be readily grasped by the camera user's fingers as best shown in FIG. 2 with the palm of the camera user's hand engaging the underlying surface of the hand grip 20. A conventional hand strap 24 may be provided to engage the back of the camera user's hand as again best shown in FIG. 2.

The lower housing portion comprises integral arcuate portions 26 and 28 which extend laterally outward from the side of the lower housing portion 18 to wrap around and engage the camera user's wrist and/or forearm in a manner as best shown in FIGS. 2 and 3 thereby steadying the camera user's hand when he grasps the hand grip 20. The arcuate portions 26 and 28 may be resiliently padded such as in foam rubber so as not to cause any discomfort or chafing to the camera user's wrist and/or forearm. In addition, the arcuate portions 26 and 28 may be resiliently flexible so as to allow their bending outward to the phantom line positions as shown in FIG. 1 to permit easy insertion or removal of the camera user's wrist and/or forearm. A flexible plastic or metal core resiliently padded in foam rubber would satisfy the aforementioned requirements.

Figure 4:
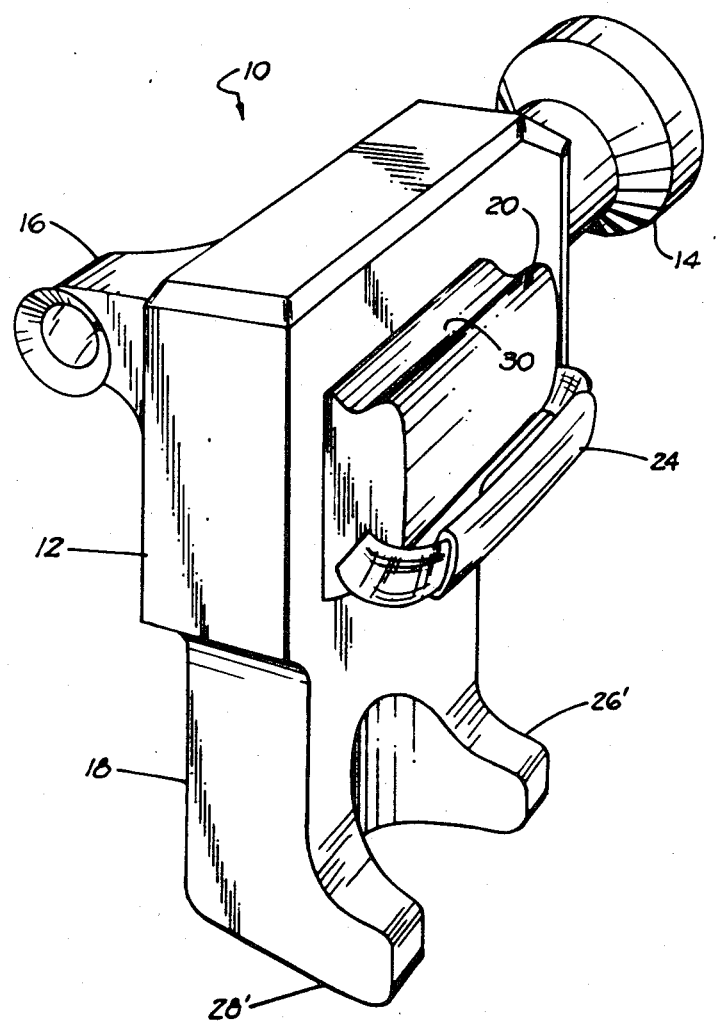
FIG. 4 is a perspective view of an alternate embodiment for the camera and handle configuration of FIG. 1.

Referring now to FIG. 4 where like numerals designate previously described elements, there is shown an alternate embodiment at 26', 28' for the aforementioned wrist engaging portions. As is apparent from the embodiment of FIG. 4, the wrist engaging portions 26', 28' may engage a lesser extent of the camera user's wrist and/or forearm than the wraparound wrist portions 26, 28 of FIG. 1. Since the wrist engaging portions 26', 28' of the embodiment of FIG. 4 only engage approximately half or 180° of the camera user's wrist and/or forearm, the portions 26' and 28' need not be flexible but preferably are resiliently padded in foam rubber.

Thus, it can be seen that the wrist and/or forearm engaging portions which extend laterally outward from the lower housing portion 18 may be tailored to engage the camera user's wrist and/or forearm at different positions which vary from wrapping around almost the entire wrist and/or forearm of the camera user as shown in FIG. 1 to alternatively engaging only a portion of the camera user's wrist and/or forearm as shown in FIG. 4. In addition, the vertical height of the wrist and/or forearm engaging portions may vary to engage only the wrist region of the camera user's arm or alternatively the forearm of the camera user or alternatively both the wrist region and the forearm of the camera user. As is readily apparent, the greater the extent to which the camera user's wrist and forearm are engaged by the camera support sections 26 and 28, the greater will be the steadying effect on the camera user's forearm and wrist and the less tiresome will become the task of holding the camera during use.

Other embodiments of the invention including additions, subtractions, deletions and other modifications of the preferred disclosed embodiments of the invention will be obvious to those skilled in the art and are within the scope of the following claims.

What is claimed is:

1. A video camera comprising:
   a housing including an upper housing portion operatively connecting an objective lens having an optical center axis therethrough and viewfinder display and a lower housing portion extending downwardly from said upper housing portion;
   a hand grip extending laterally outward from a side portion of said upper housing portion and oriented with respect to said upper housing portion so as to extend longitudinally in a direction generally parallel to the optical center axis of said objective lens; and
   support sections extending laterally outward from a side portion of said lower housing portion at a location generally underlying said hand grip for engaging the wrist and/or forearm of a camera user so as to steady his hand when his hand grasps the hand grip to hold the camera in its normally intended operative position.

2. The video camera of claim 1 wherein said support sections comprise arcuate portions for wrapping around the camera user's wrist and/or forearm.

3. The video camera of claim 2 wherein said arcuate portions are flexible to permit easy insertion and removal of the camera user's wrist and/or forearm.

4. The video camera of claim 2 wherein said arcuate portions are resiliently padded.

5. The video camera of claim 2 wherein said lower housing portion houses a video cassette recorder.

6. In a video camera of the type comprising a housing operatively connecting an objective lens having an optical center axis therethrough and viewfinder display and a hand grip extending laterally outward from a side portion of said housing and oriented with respect to said housing so as to extend longitudinally in a direction generally parallel to the optical center axis of the objective lens, the improvement comprising:
   a lower housing portion extending downwardly from said housing; and
   support sections extending laterally outward from a side portion of said lower housing portion at a location generally underlying said hand grip for engaging the wrist and/or forearm of a camera user so as to steady his hand when his hand grasps the hand grip to hold the camera in its normally intended operative position.

7. The improvement of claim 6 wherein said support sections comprise arcuate portions for wrapping around the camera user's wrist and/or forearm.

8. The improvement of claim 7 wherein said arcuate portions are flexible to permit easy insertion and removal of the camera user's wrist and/or forearm.

9. The improvement of claim 7 wherein said arcuate portions are resiliently padded.

10. The improvement of claim 7 wherein said lower housing portion houses a video cassette recorder.

* * * * *